United States Patent [19]

Evers

[11] 4,094,603
[45] June 13, 1978

[54] FLAT FIELD, ROLL FILM TRANSPORT

[76] Inventor: Ben Fowler Evers, 10315 Madrid Way, Spring Valley, Calif. 92077

[21] Appl. No.: 743,782

[22] Filed: Nov. 22, 1976

[51] Int. Cl.² .................. G03B 27/32; G03B 27/52
[52] U.S. Cl. .................................. 355/64; 352/224
[58] Field of Search .................. 355/64, 50; 352/224

[56] References Cited

U.S. PATENT DOCUMENTS

| 1,638,392 | 8/1927 | Case | 352/224 X |
| 2,600,636 | 6/1952 | Goetz et al. | 355/64 X |
| 3,033,074 | 5/1962 | Schaefer | 352/22 X |
| 3,113,498 | 12/1963 | Kallenberg | 355/64 |
| 3,547,536 | 12/1970 | Phleps | 355/64 X |
| 3,994,581 | 11/1976 | Hopkins et al. | 355/64 X |

Primary Examiner—Richard A. Wintercorn
Attorney, Agent, or Firm—Roy L. Knox

[57] ABSTRACT

A film transport capable of periodically advancing roll film to present a flattened portion of the film at an exposure station between the supply and take-up spools. As originally developed the invention is applied to processing sensitized photographic film. Such a film, even when tightly rolled upon a spool, will exhibit a tendency to curl and bow transversely when unwound from the spool, the face of the film carrying the emulsion curving inwardly. This film transport as an accessory to a paper printer periodically presents to an "enlarger" in the printer successive frame portions of 35mm film or the like, in place of the regularly dispensed sensitized paper, while eliminating the hazard of damage to the image area of the film, this latter feature being achieved by non-use of any pressure plate or hold-down springs which might abrade the film surface and the substitution of means to exert a reverse bending strain on the film and thus to achieve a localized flattening of the film at the exposure station.

9 Claims, 6 Drawing Figures

FLAT FIELD, ROLL FILM TRANSPORT

BACKGROUND OF THE INVENTION

The machines called paper printers have been used by commercial photographic studios for many years, bearing the trademarks such as B. C. Eight and DURST, but these machines are not adapted for duplicating slides onto 35 mm film or the like. There are more recent machines such as that manufactured by Honeywell and sold under the trademark REPRONAR, featuring a single lens reflux camera with a bellows and copying lens and with lamps in the base portion. There are other units of somewhat similar style, all employing cameras as such and all rather expensive. There is a need, therefore, for a reasonably simple accessory which will adapt the paper printers already owned by many commercial studios for duplicating slides onto 35 mm film or the like and there is also a need for such apparatus to function efficiently without damaging the film.

SUMMARY OF THE INVENTION

As claimed herein, the instant invention satisfies the immediately above mentioned needs, being essentially an accessory but being self-contained inasmuch as the unit is independently driven by an attached electric motor and the unit has its own supply and take-up spools as well as an exposure station structure with a unique film track combined with means to impose a reverse band strain on the film to counteract the tendency of an emulsified film to bow transversely, thus presenting a flat field or image area on the film portion being exposed at the window in a mask over the film. This means may take the form of a roller at one or both ends of the film track proper at the exposure station and when such roller is sprocketted the same is employed as an intermittent film drive control, since a given number of sprocket holes in its film, ordinarily eight, corresponds with the effective length of a frame on the film. The field or image area of the film is not contacted by the film track proper, said rollers or the mask which swings down over the exposure station, all three being relieved to prevent such contact except at the longitudinal edge portions of the film.

DETAILED DESCRIPTION OF THE PREFERRED EMBODIMENT

Figure 1:
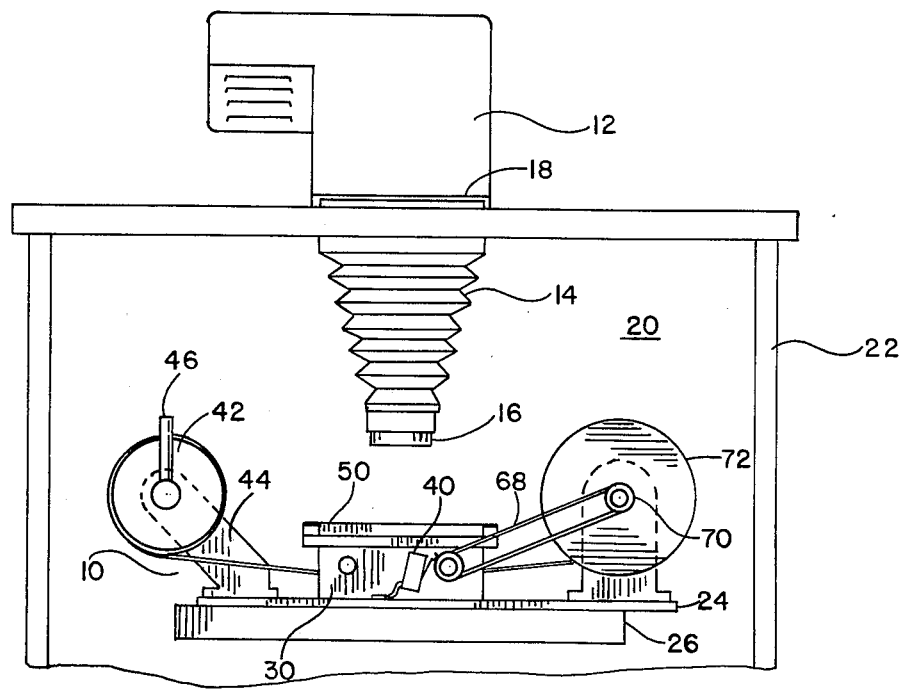
FIG. 1 is a front elevation view of the film transport unit installed in a typical copying machine the latter being diagrammatically and fragmentarily represented.
Figure 2:
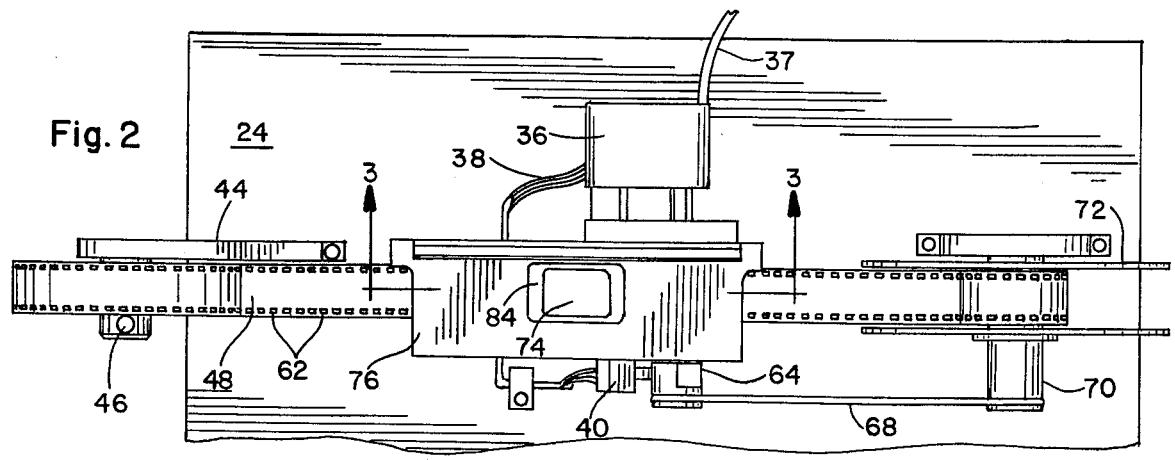
FIG. 2 is an enlarged top plan view of the film transport unit with a film being processed.

As illustrated, the film transport unit, generally indicated by the numeral 10, is conceived as ordinarily used with a unit having a lamp house 12, a bellows 14, a lens 16 and a slide holder or negative area 18, all of which are indicated in FIG. 1 as comprising the environment wherewith this invention will ordinarily be used. Since these features, together with a built-in darkroom, are found in prior art units called paper printers, such as those sold under the trademarks PAKO B. C. Eight and DURST MINIPRINTER, the instant invention may be considered as an accessory thereto. The area 20, within the frame 22 diagrammatically illustrated in FIG. 1, may be considered the built-in darkroom. Obviously the above features 12-22 are illustrative and not limiting with respect to this invention.

The film transport unit as shown has a flat base plate 24 and this is shown supported on the printer platform 26 to which it should be rigidly fixed while in use since vibrations set up by the motor 28 may result in the unit 10 creeping out of alignment with the lens 16.

Substantially centrally of the base plate 24 there is mounted, by welding or otherwise, a generally U-shaped channel member 30 having what may be considered a rear upright flange 32 and a front upright flange 34. The electric motor 36 is rigidly mounted on the rear upright flange 32 and the power lines 37 to the motor as well as the electric wiring 38 leading to the microswitch 40 are connected in use, to the corresponding wiring terminals of the operator's console, not illustrated, ordinarily to be found on any printer wherewith the present film transport unit is used, there being no inventive novelty in the manner of making the necessary connections.

A film supply spool 42, mounted by a bracket 44, on the base plate 24, with a control brake 46, feeds the film 48, ordinarily 35 mm, to the expsure station structure generally indicated by the numeral 50 and housed to a great extent by the U-shaped channel member 30. This structure includes a film track defined by parallel spaced, coplanar rails 52, shown in plan in FIG. 5, and reference to FIG. 3 will indicate how the rails are radiused as at 54 at both ends so that the film 48 will have a smooth transition onto and off of the rails. The roller 56 is rotatively mounted to member 30 at the exit end of the rails 52 and is driven by the electric motor 36. This roller 56 is undercut at the center as at 58 and has sprockets 60 to engage sprocket holes 62 in the film in order to advance the film. A dual lobed cam 64 is mounted on the shaft of roller 56 outside the front upright flange 34 and this cam operates the microswitch 40. One-half revolution of the 16 tooth sprocket 60 will advance the film one frame length corresponding to eight sprocket holes in the film, the simple circuitry for such control being well known and not claimed as being novel in this apparatus. Outside the cam 64, a pulley 66, driven by the same shaft, drives a slip belt 68 entrained about pulley 70 on the shaft of take-up spool or reel 72.

A most important feature of this invention will now be evident, namely, the relative positioning of the roller 58 and the rails. The roller 58 must be below the level of the rails so as to cause a sharp bend in the sensitized film which has an emulsion on what is here the upper side of the film and consequently has a strong tendency to curve or bow transversely of the film and inwardly on the emulsion side. Bending the film down sharply immediately outside the exposure area makes the film snap back to a substantially planar form in the area between the rails 52 including the area of exposure at the window 74 of the mask 76. The before-mentioned radiused ends 54 of the rails 52 of the film track may be properly thought of as contributary means in causing the reverse bending and consequent flattening of the film. It is also noteworthy that the roller 78 with its sprockets 80 also assists in this film flattening action, this roller 78 being similarly positioned at the entrance end of the exposure station structure 50 but this roller 52 is freely rotatably mounted on and between the flanges 32 and 34.

Figure 3:
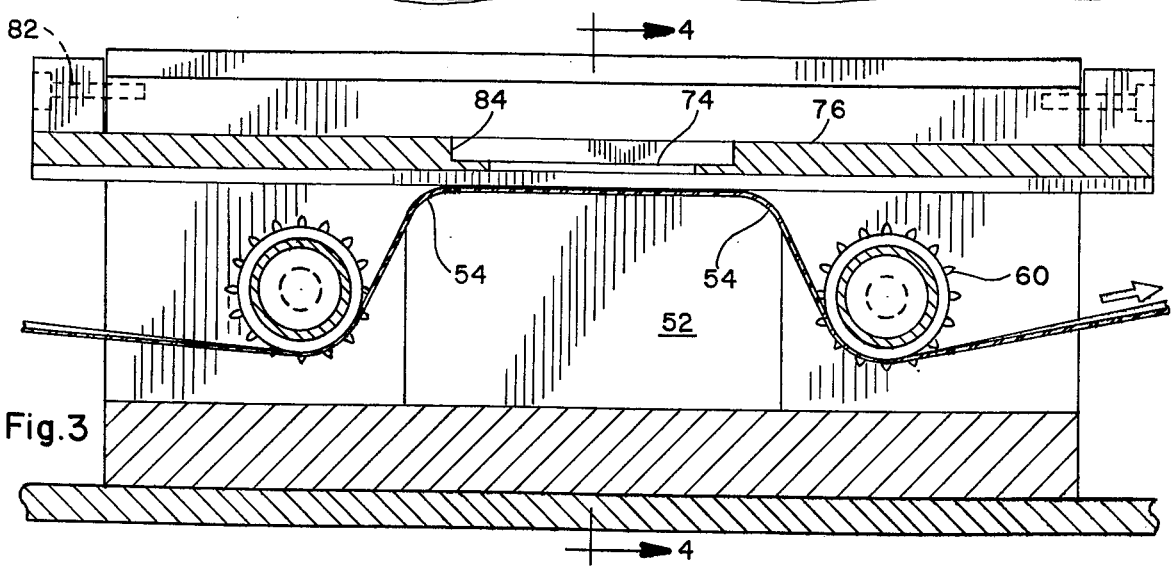
FIG. 3 is an enlarged sectional view taken on line 3—3 of FIG. 2.
Figure 4:
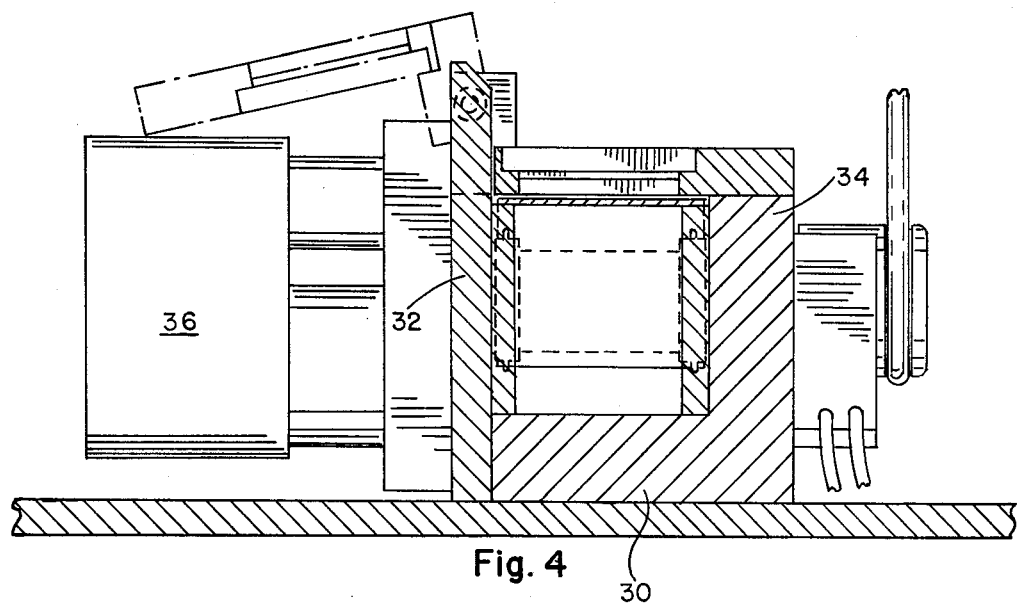
FIG. 4 is a sectional view taken on line 4—4 of FIG. 3 with the mask shown in inoperative position in dash lines.
Figure 5:
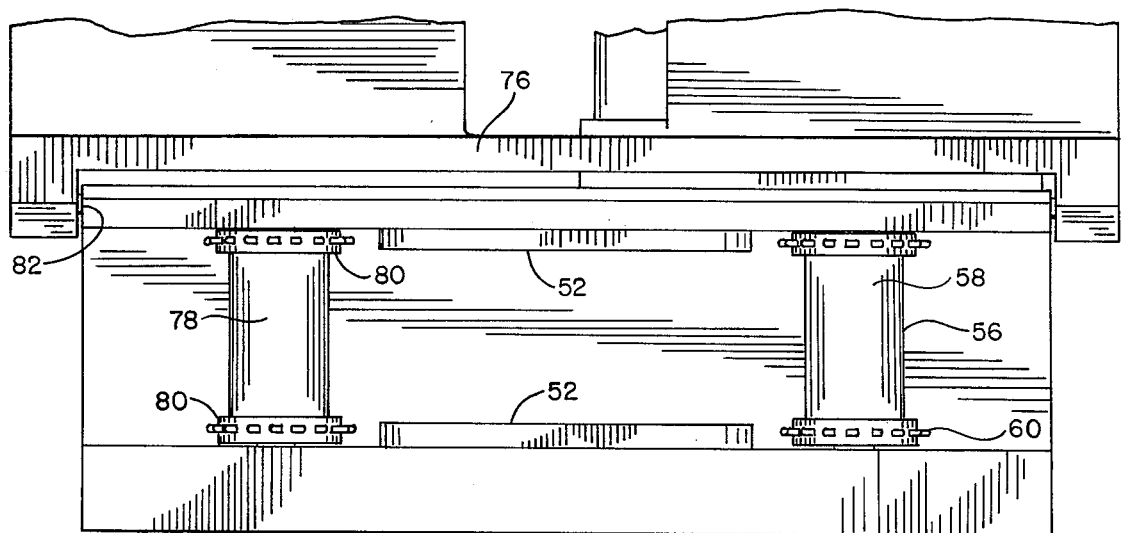
FIG. 5 is a top plan view of the unit with the mask in a similar inoperative position.
Figure 6:
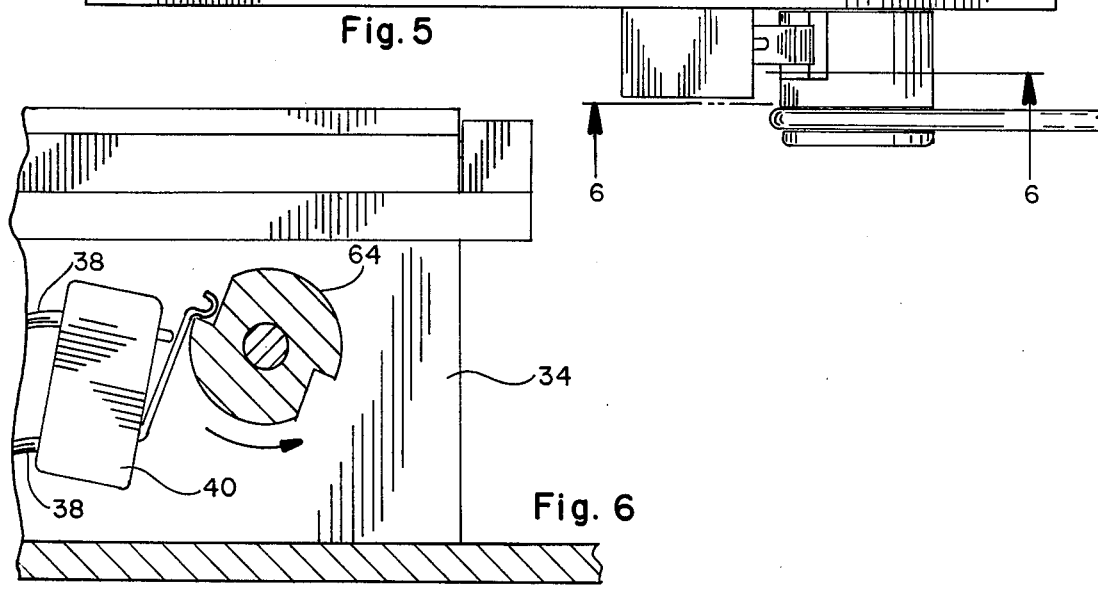
FIG. 6 is a sectional view taken on line 6—6 of FIG. 5, to show the intermittent drive means.

Finally, it will be noted that the mask 76 is hingedly mounted as at 82 on the rear upright 32 as shown in FIGS. 3, 4, and 5. The mask is preferably of sufficient weight to obviate the necessity for hold-down springs and the mask is countersunk as at 86 to minimize the depth of peripheral edge portion facing the film and thus to minimize the amount of reflection of light in this area.

The operation of this invention will be clear from a consideration of the foregoing. It may be noted that the foregoing specification of this transport unit is not proposed as limiting the device to 1:1 reproduction of 35 mm film although this may be its principal use and obviously the transport unit may be used with both black and white as well as color negatives and with internegatives. Other adaptations will occur to those skilled in the art.

I claim:

1. A roll film transport for use with a paper printer or the like, comprising:
   (a) a supporting base plate;
   (b) a supply spool and a take-up spool operatively mounted on said base plate;
   (c) an exposure station structure between said spools and having a film track defined by a pair of narrow, co-planar, spaced rails to receive the longitudinal edge portions only of a film being processed, and having a mask operatively positioned slightly above said rails and having a window opening between the rails and dimensioned to expose a single frame of film being processed;
   (d) means to bend a film sharply downwardly at at least one end of said film track in said exposure station structure immediately outside the exposure area thereof whereby the film is flattened temporarily in a portion thereof including that portion at said window opening; and
   (e) means to slip drive said take-up spool and means to advance the film intermittently to expose successive frame portions of the film in said window opening.

2. A film transport according to claim 1 wherein said (d) means to bend comprises a roller rotatively immediately mounted beyond at least one pair of the ends of said rails, said roller having portions thereof adapted for rolling contact with the film.

3. A film transport according to claim 2 wherein said roller portions are sprockets with teeth to engage sprocket holes in a film being processed, and said (e) means to advance the film intermittently comprises a motor operatively connected to said sprockets.

4. A film transport according to claim 3 wherein said sprockets are substantially the same transverse width as said rails and said roller is undercut between the sprockets so that the image portion of the film being processed is not touched and therefore not damaged by said rails and roller.

5. A film transport according to claim 1 wherein said (d) means to bend is substantially duplicated at the other end of said film track in the exposure station structure.

6. A film transport according to claim 1 wherein said film track is terminally radiused to provide a smooth transition of the film from said film track to said (d) means to bend.

7. A film transport according to claim 5 wherein said film track is terminally radiused at both ends of both rails to provide a smooth transition of the film when entering and leaving said film track.

8. A film transport according to claim 1 wherein said mask is hinged to said exposure station structure and is relieved so that in operative position the mask does not contact the image portion of a film being processed.

9. A film transport according to claim 1 and wherein said mask is countersunk periherally of the window opening therein so that said opening is defined by a relatively sharp edge to minimize reflection of light from said edge toward a film being processed.

* * * * *